US009534541B2

(12) United States Patent
Singh et al.

(10) Patent No.: US 9,534,541 B2
(45) Date of Patent: Jan. 3, 2017

(54) SYSTEM AND METHOD FOR IMPROVING EFFICIENCY OF A GAS TURBINE ENGINE

(71) Applicant: General Electric Company, Schenectady, NY (US)

(72) Inventors: Kapil Kumar Singh, Rexford, NY (US); Sherif Hatem Abdulla Mohamed, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 574 days.

(21) Appl. No.: 14/051,474

(22) Filed: Oct. 11, 2013

(65) Prior Publication Data

US 2015/0101340 A1    Apr. 16, 2015

(51) Int. Cl.
*F02C 9/18* (2006.01)
*F02C 6/00* (2006.01)

(52) U.S. Cl.
CPC *F02C 9/18* (2013.01); *F02C 6/003* (2013.01)

(58) Field of Classification Search
CPC ............... F02C 6/003; F02C 6/00; F02C 9/18; F02C 1/00; F23R 2900/03041
See application file for complete search history.

(56) References Cited

U.S. PATENT DOCUMENTS

| 2,621,475 A * | 12/1952 | Loy | F02C 3/34 60/39.17 |
|---|---|---|---|
| 3,514,954 A | 6/1970 | Colley | |
| 3,633,362 A | 1/1972 | Sotheran et al. | |
| 4,085,583 A * | 4/1978 | Klees | F02K 3/075 60/204 |
| 6,141,953 A * | 11/2000 | Mongia | F02C 3/22 60/39.17 |
| 6,397,575 B2 | 6/2002 | Tomlinson et al. | |
| 6,523,346 B1 * | 2/2003 | Hoffmann | F01K 23/10 60/646 |

(Continued)

FOREIGN PATENT DOCUMENTS

GB        904933 A    9/1962

OTHER PUBLICATIONS

S. Zaheer Akhtar, "Proper Steam Bypass System Design Avoids Steam Turbine Overheating", Downloaded from Internet<http://www.power-eng.com/content/pe/en/articles/print/volume-107/issue-6/features/proper-steam-bypasssystem-design-avoids-steam-turbine-overheating.html> on Oct. 10, 2013; Power Engineering, vol. 107, Issue 6, Jun. 1, 2003; 6 Pages.

*Primary Examiner* — Carlos A Rivera
(74) *Attorney, Agent, or Firm* — Seema S. Katrgadda

(57) ABSTRACT

A gas turbine engine is presented. The gas turbine engine includes a control unit having a first bypass channel that is coupled between an outlet of a first turbine and an inlet of a second turbine. Further, the control unit includes a second bypass channel coupled between a first outlet of a compressor unit and the inlet of the second turbine. Additionally, the control unit includes a first control valve coupled to the first bypass channel and configured to direct at least a first portion of exhaust gas from the first turbine to the inlet of the second turbine via the first bypass channel. Furthermore, the control unit includes a second control valve coupled to the second bypass channel and configured to direct at least a first portion of compressed air from the compressor unit to the inlet of the second turbine via the second bypass channel.

22 Claims, 3 Drawing Sheets

(56) References Cited

U.S. PATENT DOCUMENTS

| | | | |
|---|---|---|---|
| 6,606,864 B2* | 8/2003 | MacKay | F02C 1/06 |
| | | | 60/39.41 |
| 6,817,187 B2* | 11/2004 | Yu | F02C 3/365 |
| | | | 60/39.17 |
| 6,971,227 B2 | 12/2005 | Dolak et al. | |
| 7,568,335 B2* | 8/2009 | Althaus | F02C 6/003 |
| | | | 60/39.17 |
| 8,006,477 B2 | 8/2011 | Dinu | |
| 2007/0033945 A1 | 2/2007 | Goldmeer et al. | |
| 2009/0260368 A1* | 10/2009 | Benz | C10J 3/00 |
| | | | 60/780 |
| 2010/0242429 A1 | 9/2010 | Smith | |
| 2012/0151935 A1* | 6/2012 | Bunker | F23R 3/005 |
| | | | 60/774 |
| 2014/0013765 A1* | 1/2014 | Studerus | F02C 3/00 |
| | | | 60/779 |

* cited by examiner

SYSTEM AND METHOD FOR IMPROVING EFFICIENCY OF A GAS TURBINE ENGINE

BACKGROUND

Embodiments of the present disclosure relate generally to a gas turbine engine, and more particularly to a system and method for improving efficiency of the gas turbine engine.

Typically, gas turbine engines are used for converting thermal or heat energy into mechanical energy, which may then be used for applications, such as power generation, marine propulsion, and gas compression. In general, a gas turbine engine includes a compressor for compressing air and a combustor for combining the compressed air with fuel to form a fuel mixture. Thereafter, the fuel mixture is combusted or ignited in the combustor to generate a post combustion gas or a working gas. Typically, the post combustion gas is a high pressure, high temperature gas stream that is expanded while being conveyed through a turbine to convert thermal energy of the post combustion gas into mechanical energy. Further, in one example, the converted mechanical energy may be used to rotate a turbine shaft that is coupled to machinery, such as an electrical generator for producing electrical energy.

In general, during the process of combustion, the oxygen content in the compressed air may not be fully consumed. As a result, the post combustion gas that exits from the turbine includes at least 15% mass of oxygen, which has the potential of oxidizing more fuel. Therefore, some gas turbine engines deploy a reheat combustor, where the post combustion gas is re-combusted after being mixed with additional fuel. Further, the re-combusted post combustion gas is expanded in another turbine section to generate additional power. Thus, the deployment of the reheat combustor and another turbine section utilizes the oxidizing potential of the post combustion gas, which in turn increases the performance of the engine.

However, in conventional gas turbine engines, the reheat combustor poses significant challenges due to high temperature of the post combustion gas, reduced oxygen concentration in the post combustion gas, and presence of one or more species in the post combustion gas. This in turn poses substantial limitations on the combustor operation due to issues related to auto-ignition, flame stabilization, and emissions in the reheat combustor.

BRIEF DESCRIPTION

In accordance with one embodiment described herein, a gas turbine engine is presented. The gas turbine engine includes a control unit. Further, the control unit included a first bypass channel operatively coupled between an outlet of a first turbine and an inlet of a second turbine and configured to bypass a reheat combustor. Also, the control unit includes a second bypass channel operatively coupled between a first outlet of a compressor unit and the inlet of the second turbine and configured to bypass the reheat combustor. In addition, the control unit includes a first control valve operatively coupled to the first bypass channel and configured to direct at least a first portion of exhaust gas from the first turbine to the inlet of the second turbine via the first bypass channel. Furthermore, the control unit includes a second control valve operatively coupled to the second bypass channel and configured to direct at least a first portion of compressed air from the compressor unit to the inlet of the second turbine via the second bypass channel.

In accordance with a further aspect of the present disclosure, a method for enhancing efficiency of a gas turbine engine is presented. The method includes directing, by a first control valve, a first portion of exhaust gas from a first turbine to a second turbine. Also, the method includes directing, by the first control valve, a second portion of the exhaust gas from the first turbine to a reheat combustor. In addition, the method includes directing, by a second control valve, a first portion of compressed air from a compressor unit to the second turbine. Furthermore, the method includes directing, by the second control valve, a second portion of the compressed air from the compressor unit to the reheat combustor.

In accordance with another aspect of the present disclosure, a gas turbine engine is presented. The gas turbine engine includes a compressor unit for compressing air. Further, the gas turbine engine includes a primary combustor operatively coupled to the compressor unit and configured to generate a primary combustion gas by compressing the air received from the compressor unit. Also, the gas turbine engine includes a first turbine operatively coupled to the primary combustor and configured to produce exhaust gas. Furthermore, the gas turbine engine includes a second turbine operatively coupled to the first turbine. Additionally, the gas turbine engine includes a control unit coupled to an outlet of the first turbine and an outlet of the compressor unit and configured to direct at least a first portion of the exhaust gas from the first turbine to an inlet of the second turbine and direct at least a first portion of the compressed air from the compressor unit to the inlet of the second turbine. Further, the gas turbine engine includes a reheat combustor operatively coupled to the control unit and the second turbine and configured to receive at least a second portion of the exhaust gas from the first turbine and a second portion of the compressed air from the compressor unit and generate a combustion gas using the second portion of the exhaust gas and the second portion of the compressed air, wherein the second turbine is configured to receive a mixture including at least the combustion gas from the reheat combustor, the first portion of the exhaust gas from the first turbine, and the first portion of the compressed air from the compressor unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for enhancing efficiency of a gas turbine engine are presented. By employing the methods and the various embodiments of the system described hereinafter, the oxidizing potential of post combustion gas may be fully utilized, which in turn increases the efficiency of the gas turbine engine. Also, one or more parameters, such as temperature, species concentration, and oxygen concentration in the post combustion gas may be effectively controlled to improve the reheat combustor operation in the gas turbine engine.

Figure 1:
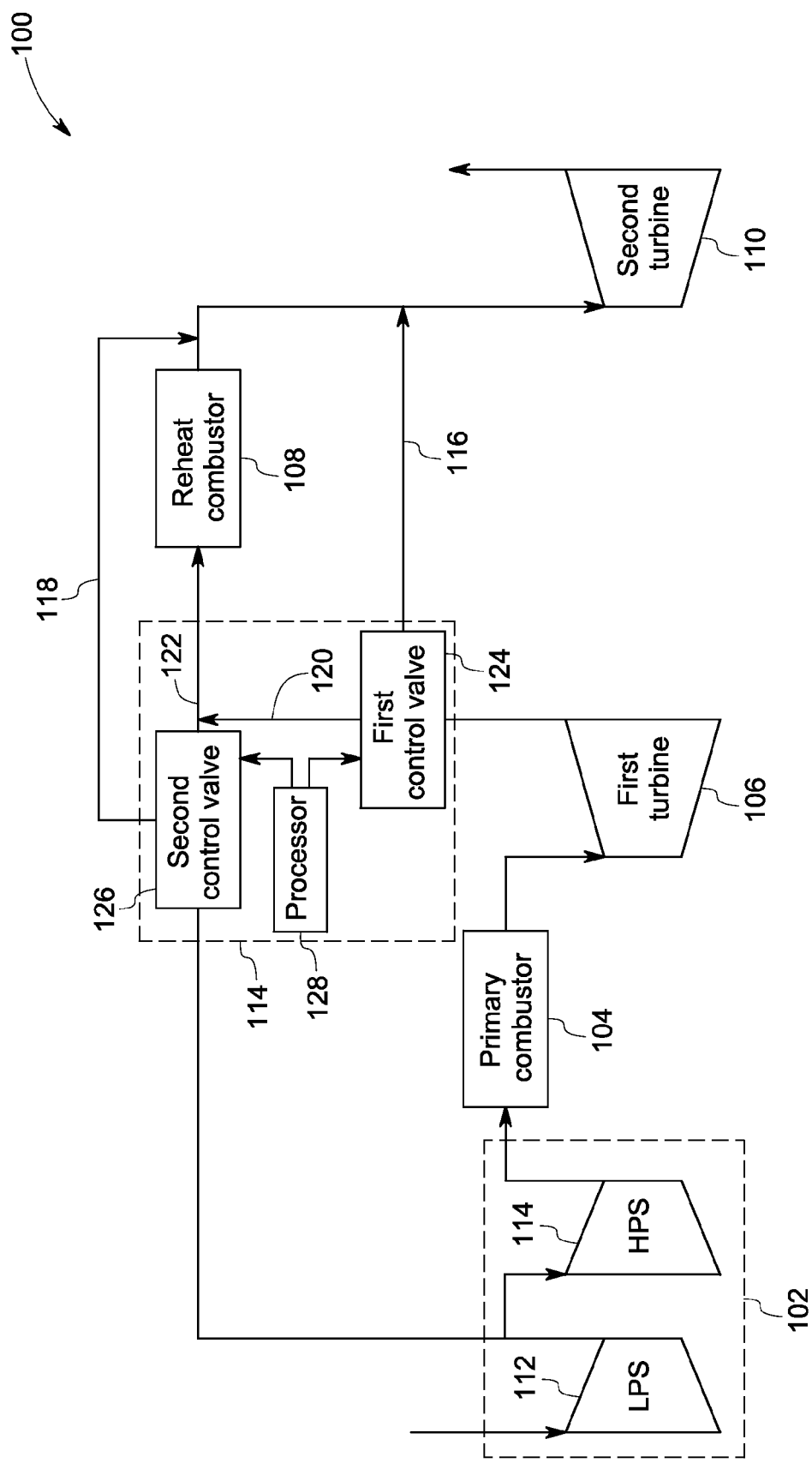
FIG. 1 is a block diagram of an exemplary gas turbine engine, in accordance with aspects of the present disclosure.

Turning now to the drawings and referring to FIG. 1, a block diagram 100 of a gas turbine engine, in accordance with aspects of the present disclosure, is depicted. The gas turbine engine 100 may be used for converting thermal or heat energy into mechanical energy, which in turn is used for applications, such as power generation, marine propulsion, and gas compression. In one example, the converted mechanical energy may be used to drive machinery, such as an electrical generator to generate electrical energy.

In a presently contemplated configuration, the gas turbine engine 100 may include a compressor unit 102, a primary combustor 104, a first turbine 106, a reheat combustor 108, and a second turbine 110. The compressor unit 102 may be configured to provide a compressed air to the primary combustor 104 and the reheat combustor 108. Particularly, in one embodiment, the compressor unit 102 may include a low pressure subunit (LPS) 112 and a high pressure subunit (HPS) 114. The low pressure subunit 112 may be configured to receive an air stream that includes atmospheric air at an inlet of the low pressure subunit 112. Further, the low pressure subunit 112 may be configured to compress the received air stream to a desired low pressure and temperature. The compressed air stream may be provided to an inlet of the high pressure subunit 114 and an inlet of the reheat combustor 108, as depicted in FIG. 1. Furthermore, the high pressure subunit 114 may be configured to further compress the compressed air stream to a desired high pressure and temperature. It may be noted that the compressor unit 102 may include one or more pressure subunits, and is not limited to the number of pressure subunits shown in FIG. 1.

After compression, a high pressure compressed air stream exits the high pressure subunit 114 via an outlet and may be provided to the primary combustor 104. At the primary combustor 104, the received high pressure compressed air stream may be mixed with a fuel stream to form a primary fuel mixture. The primary fuel mixture may be ignited or combusted to form post combustion gas having a high temperature and high pressure. It may be noted that the terms "post combustion gas" and "primary combustion gas" may be used interchangeably. Further, the post combustion gas may be provided to the first turbine 106, where the post combustion gas may be expanded to convert thermal energy associated with the post combustion gas into mechanical energy. After expansion, the post combustion gas exits the first turbine 106 as exhaust gas. In one embodiment, the first turbine 106 may be a high pressure turbine that utilizes the converted mechanical energy to rotate a turbine shaft.

Furthermore, the exhaust gas may include a certain amount of unutilized heated oxygen. In one example, the exhaust gas may include an oxygen mass that is in a range from about 15% to about 18% of the total mass of the compressed air provided by the compressor unit 102. Instead of releasing this oxygen rich exhaust gas to the atmosphere, the gas turbine engine 100 may be configured to deploy the reheat combustor 108 and the second turbine 110 to generate additional power. Particularly, the reheat combustor 108 may be configured to utilize the exhaust gas from the first turbine 106 to produce a combustion gas. This combustion gas may in turn be provided to the second turbine 110 to convert thermal energy associated with the combustion gas into mechanical energy. However, while utilizing the exhaust gas, the reheat combustor 108 may face significant challenges due to high temperature of the exhaust gas, reduced oxygen concentration in the exhaust gas, and/or presence of one or more combustion products in the exhaust gas. Some of the challenges or issues faced by the reheat combustor 108 may relate to auto-ignition, flame stabilization, emissions, and turn down capability at all load conditions. In one example, auto-ignition propensity may increase significantly with the increased gas temperature in the presence of fuel and oxygen. If such auto-ignition occurs inside a mixing zone of the reheat combustor 108, a sustained combustion may occur, which in turn damages the reheat combustor 108.

These shortcomings associated with presently available techniques may be circumvented via use of an exemplary control unit 114 that is used for enhancing the efficiency of the gas turbine engine 100. Particularly, the control unit 114 may be configured to control the flow of an oxidizer stream to the reheat combustor 108 based on one or more parameters associated with the exhaust gas that is provided to the reheat combustor 108. In one example, the oxidizer stream may include a determined portion of the exhaust gas from the first turbine 106 and/or a determined portion of the compressed air from the compressor unit 102. Also, the one or more parameters associated with the exhaust gas may include oxygen concentration, temperature, species concentration, or combination thereof, associated with the exhaust gas at the inlet of the reheat combustor 108. By controlling the flow of the oxidizer stream to the reheat combustor 108, operating efficiency of the reheat combustor 108 may be significantly improved, which in turn enhances the efficiency of the gas turbine engine 100. Also, issues such as auto-ignition, flame stabilization, and emissions in the reheat combustor 108 may be minimized. In one example, these issues may be reduced by controlling the flow of exhaust gas and compressed air to the reheat combustor 108. More specifically, the flow of exhaust gas may be controlled by directing an undesired amount of exhaust gas and/or the compressed air to the second turbine 110 so as to bypass the reheat combustor 108.

As depicted in a presently contemplated configuration, the control unit 114 may include a first bypass channel 116, a second bypass channel 118, a third channel 120, and a fourth channel 122. Additionally, the control unit 114 may also include a first control valve 124 and a second control valve 126. In one example, the first bypass channel 116 may be operatively coupled between an outlet of the first turbine 106 and an inlet of the second turbine 110. Also, the first bypass channel 116 may be configured to bypass the reheat combustor 108.

Further, the first control valve 124 may be coupled to the first bypass channel 116. The first control valve 124 may be used to direct at least a first portion of the exhaust gas from the first turbine 106 to the second turbine 110 via the first bypass channel 116. Also, the first control valve 124 may be configured to direct at least a second portion of the exhaust gas from the first turbine 106 to the inlet of the reheat combustor 108 via the third channel 120. In one embodiment, the third channel 120 may be coupled between the first control valve 124 and the reheat combustor 108.

In a similar manner, the second bypass channel 118 may be operatively coupled between an outlet of the compressor unit 102 and the inlet of the second turbine 110. In one embodiment, the second bypass channel 118 may be coupled between an outlet of the low-pressure subunit 112 and the inlet of the second turbine 110. Also, the second bypass channel 118 may be configured to bypass the reheat combustor 108.

Moreover, the second control valve 126 may be coupled to the second bypass channel 118. The second control valve 126 may be used to direct at least a first portion of the compressed air from the compressor unit 102 to the inlet of the second turbine 110 via the second bypass channel 118. Also, the second control valve 126 may be used to direct at least a second portion of the compressed air to the inlet of the reheat combustor 108 via the fourth channel 122. In one embodiment, the fourth channel 122 may be coupled between the second control valve 126 and the reheat combustor 108, as depicted in FIG. 1.

The control unit 114 may be configured to measure one or more parameters associated with the gas turbine engine 100. In one example, the control unit 114 may utilize a processor 128 and one or more sensors (not shown in FIG. 1) to measure parameters associated with the exhaust gas. Particularly, the processor 128 may be configured to measure the one or more parameters associated with the exhaust gas that is provided to the inlet of the reheat combustor 108. The one or more parameters may include the oxygen concentration, the temperature, the species concentration, or combinations thereof, corresponding to the exhaust gas. Furthermore, the processor 128 may be configured to determine whether the one or more parameters associated with the exhaust gas are within a desired range. For example, the processor 128 may be configured to determine whether the temperature of the exhaust gas is above a desired temperature. In another example, the processor 128 may be configured to determine whether the species concentration in the exhaust gas is above a desired concentration value. In yet another example, the processor 128 may be configured to determine whether the oxygen concentration in the exhaust gas is below a desired oxygen mass value.

It may be noted that in one embodiment, the desired ranges corresponding to the parameters associated with the exhaust gas may be set based on the desired efficiency of the gas turbine engine 100. Particularly, the processor 128 may be configured to determine or compute the desired efficiency of the gas turbine engine 100 based on a current pressure ratio, fuel composition, and/or operating condition of the gas turbine engine 100. In one example, if the pressure ratio is 40, then the processor 128 may determine a value for the desired efficiency of the gas turbine engine 100 as 80%. In accordance with aspects of the present disclosure, the processor 128 may be configured to determine and/or adjust a desired range for each of the parameters associated with the exhaust gas so as to achieve the desired efficiency of the gas turbine engine 100.

Furthermore, upon determining the parameters associated with the exhaust gas, the processor 128 may be configured to communicate one or more control signals to the first control valve 124 and/or the second control valve 126. Based on the control signals received from the processor 128, the first control valve 124 may be configured to direct the first portion of the exhaust gas to the inlet of the second turbine 110. In accordance with exemplary aspects of the present disclosure, the control unit 114 may be configured to alter or modify a value of the first portion of the exhaust gas that is channelized to the second turbine 110. In one example, the value of the first portion of the exhaust gas may range from about 0% to about 100% depending upon the values of the determined parameters. In one example, if the species concentration in the exhaust gas is 10% by volume, then the first portion of the exhaust gas may include 85% by mass of exhaust gas that may be directed to the second turbine 110 so as to bypass the reheat combustor 108. The first control valve 124 may be configured to concurrently direct the second portion or remaining portion of the exhaust gas to the inlet of the reheat combustor 108. It may be noted that if the first portion of the exhaust gas is X % of the total exhaust gas, then the second portion of the exhaust gas may be (100-X) % of the total exhaust gas. In one embodiment, the value of the first portion of the exhaust gas may vary based on different fuel compositions and different operating conditions of the gas turbine engine 100.

In addition, based on the control signals received from the processor 128, the second control valve 126 may be configured to direct the first portion of the compressed air to the inlet of the second turbine 110. In accordance with exemplary aspects of the present disclosure, the control unit 114 may be configured to alter or modify a value of the first portion of the compressed air that is channelized to the second turbine 110. In one example, the value of the first portion of the compressed air may range from about 0% to about 100% depending upon the values of the determined parameters. In one example, if the species concentration in the exhaust gas is 10% by volume, then 85% by mass of the compressed air may be directed to the second turbine 110 so as to bypass the reheat combustor 108. The second control valve 126 may be configured to concurrently direct the second portion of the compressed air to the inlet of the reheat combustor 108. It may be noted that if the first portion of the compressed air is Y % of the total compressed air, then the second portion of the compressed air is (100-Y) % of the total compressed air.

Furthermore, the reheat combustor 108 may utilize the second portion of the exhaust gas received from the first control valve 124 and the second portion of the compressed air received from the second control valve 126 to form a first mixture in the reheat combustor 108. The first mixture may be ignited or combusted to produce the combustion gas that may be provided to the second turbine 110. Additionally, the second turbine 110 may be configured to combine the combustion gas, the first portion of the compressed air, and the first portion of the exhaust gas to form a second mixture. The second turbine 110 may be configured to convert thermal energy associated with the second mixture into mechanical energy. Also, this converted mechanical energy may be used along with the mechanical energy produced by the first turbine 106 for one or more applications, such as power generation, marine propulsion, and gas compression.

Thus, the control unit 114 effectively controls the amount of exhaust gas and the compressed air that are provided to the reheat combustor 108. This in turn prevents issues such as auto-ignition, flame stabilization, and emissions in the gas turbine engine 100, and also improves the efficiency of the gas turbine engine 100.

Figure 2:
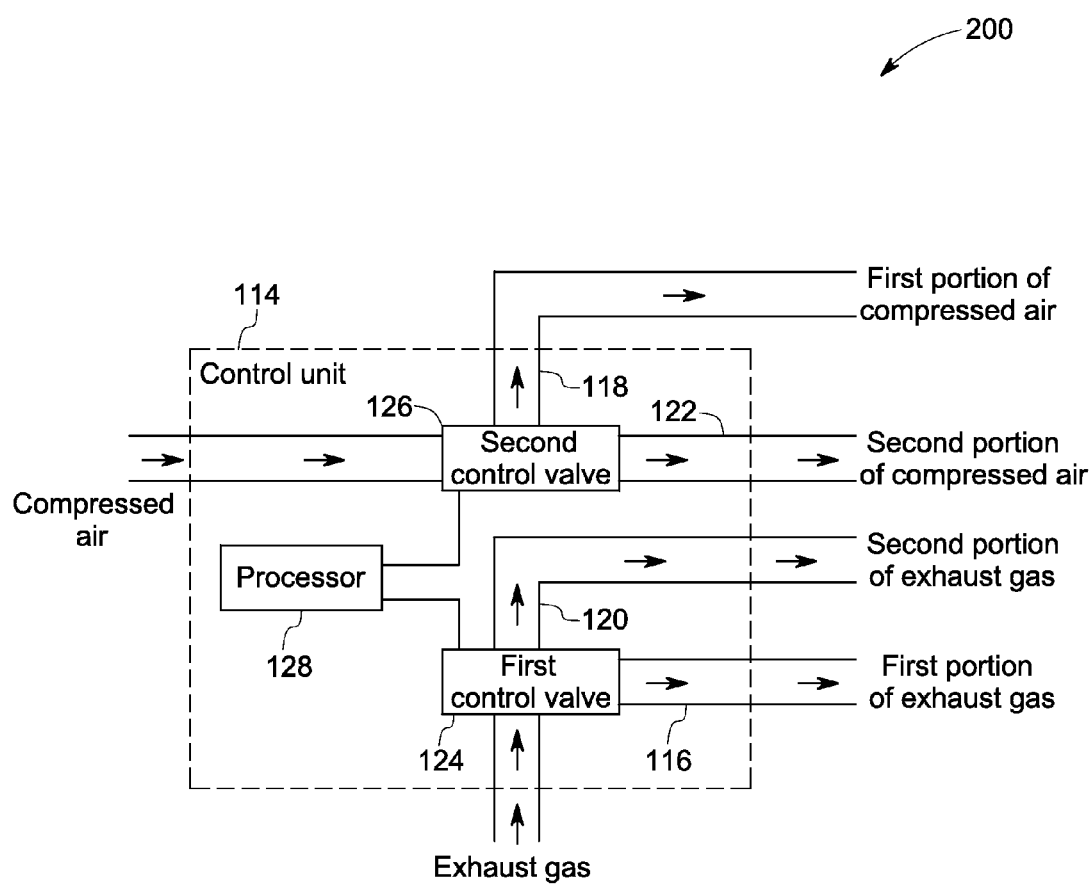
FIG. 2 is a block diagram of a control unit for use in the gas turbine engine of FIG. 1, in accordance with aspects of the present disclosure.

Referring to FIG. 2, a block diagram representation 200 of a control unit such as the control unit 114 of FIG. 1, in accordance with aspects of the present disclosure, is depicted. For ease of understanding, the control unit 114 is described with reference to the components of FIG. 1. The control unit 114 may be configured to enhance the efficiency of the gas turbine engine 100 by controlling an amount of exhaust gas and/or compressed air that are provided to the reheat combustor 108 as an oxidizer stream.

As depicted in FIG. 2, the control unit 114 may include the processor 128, the first control valve 124, the second control valve 126, the first bypass channel 116, the second bypass channel 118, the third channel 120, and the fourth channel 122. The first bypass channel 116 may be coupled between the first turbine 106 and the second turbine 110 and configured to bypass the reheat combustor 108. In a similar manner, the second bypass channel 118 may be coupled between the compressor unit 102 and the second turbine 110 and configured to bypass the reheat combustor 108. Further, the first control valve 124 may be coupled to the first bypass channel 116, while the second control valve 126 may be coupled to the second bypass channel 118. Also, the third channel 120 may be coupled between the first control valve 124 and the reheat combustor 108, and the fourth channel 122 may be coupled between the second control valve 126 and the reheat combustor 108, as depicted in FIG. 2.

As previously described, the control unit 114 and the processor 128 in part may be configured to measure one or more parameters corresponding to the exhaust gas at an inlet of the reheat combustor 108. The one or more parameters may include oxygen concentration, temperature, species concentration, or combinations thereof, associated with the exhaust gas. Further, the processor 128 may be configured to determine whether the one or more parameters associated with the exhaust gas are within a desired range. For example, the processor 128 may be configured to verify whether the temperature of the second portion of the exhaust gas is above a desired temperature. In another example, the processor 128 may be configured to verify whether the oxygen concentration in the second portion of the exhaust gas is below a desired oxygen mass value. Thereafter, the processor 128 may be configured to communicate one or more control signals to the first control valve 124 and the second control valve 126 based on the determined parameters. In one embodiment, the processor 126 may use a look-up table to generate the one or more control signals. The look-up table may include different values of these parameters and their corresponding control signals that need to be provided to the first control valve 124 and the second control valve 126.

Upon receiving the control signals, the first control valve 124 and the second control valve 126 may be configured to adjust a value of the second portion of the exhaust gas and a value of the second portion of the compressed air that are provided to the reheat combustor 108 as the oxidizer stream. Particularly, based on the control signals received from the processor 128, the first control valve 124 may adjust its valve opening so as to direct X % of the total exhaust gas as the first portion of the exhaust gas to the second turbine 110. The first control valve 124 may be configured to concurrently direct (100-X) % of the total exhaust gas as the second portion of the exhaust gas to the reheat combustor 108. In one example, if the temperature of the second portion of the exhaust gas is above the desired temperature, the processor 128 may be configured to communicate the control signals to the first control valve 124. Upon receiving the control signals, the first control valve 124 may adjust the valve opening in such a way that a substantial portion of the exhaust gas is channeled to the second turbine 110, while a small portion or remaining portion of the exhaust gas is channeled to the reheat combustor 108. Consequently, the substantial portion of the exhaust gas is channeled to the second turbine 110 while bypassing the reheat combustor 108. Accordingly, the temperature of the exhaust gas at the inlet of the reheat combustor 108 is reduced below the desired temperature value or maintained within the desired range.

In a similar manner, based on the control signals received from the processor 128, the second control valve 126 may be configured to adjust its valve opening so as to direct the first portion of the compressed air to the second turbine 110 and the second portion of the compressed air to the reheat combustor 108. In one example, if the oxygen concentration of the exhaust gas provided to the reheat combustor 108 is above the desired value, the processor 128 may be configured to communicate the control signals to the second control valve 126 to adjust the valve opening in such a way that a substantial portion of the compressed air is directed to the second turbine 110, while a small portion or remaining portion of the compressed air is directed to the reheat combustor 108. Thus, by controlling the flow of compressed air to the reheat combustor 108, the oxygen concentration or oxygen mass at the inlet of the reheat combustor 108 may be maintained below a desired value or within the desired range. Thus, the control unit 114 may be configured to effectively control the amount of the exhaust gas and the compressed air that are provided to the reheat combustor 108, which in turn improves the efficiency of the gas turbine engine 100.

Figure 3:
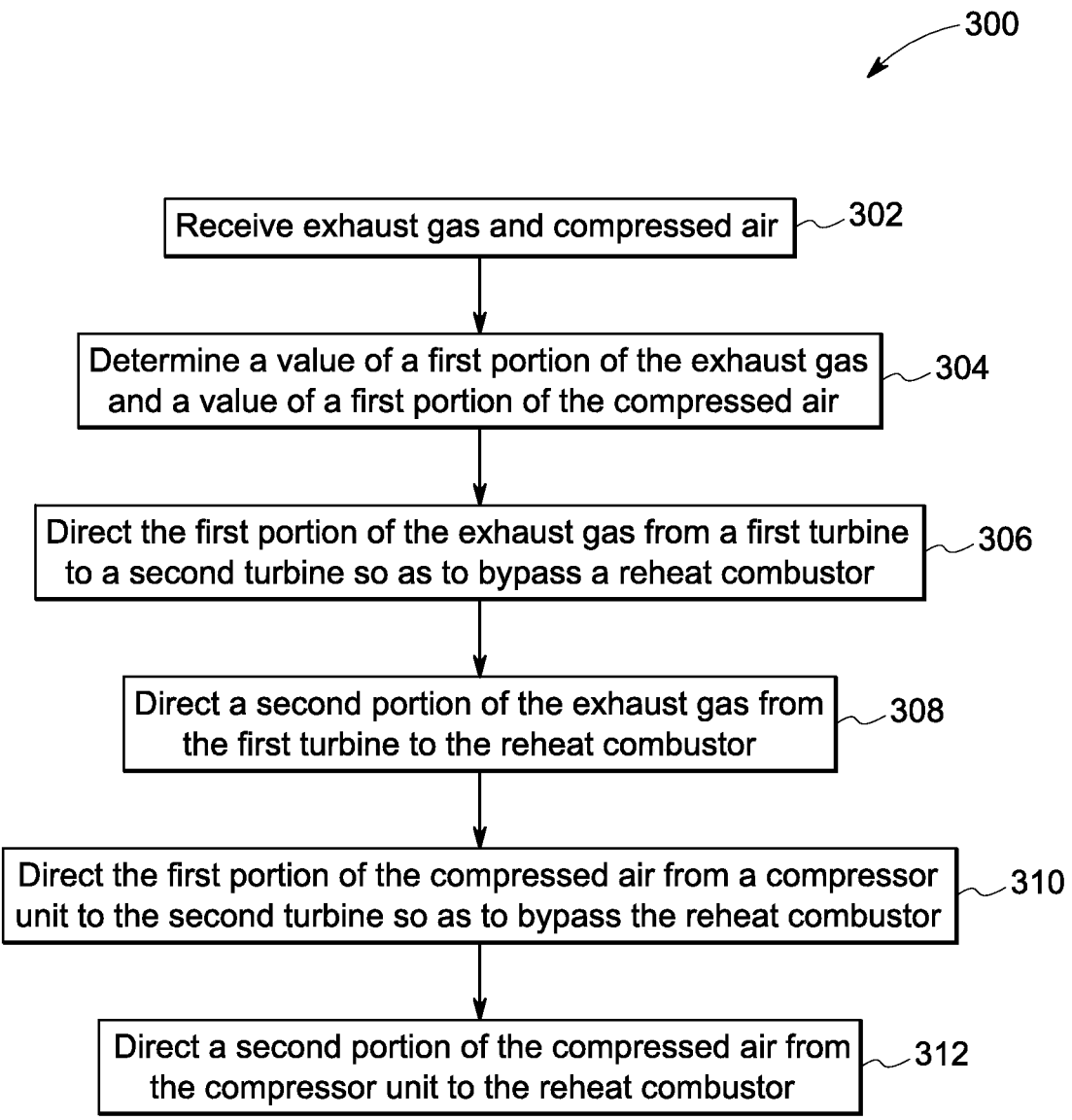
FIG. 3 is a flow chart illustrating a method for enhancing efficiency of a gas turbine engine, in accordance with aspects of the present disclosure.

Referring to FIG. 3, a flow chart 300 illustrating a method for enhancing efficiency of a gas turbine engine, in accordance with aspects of the present disclosure, is depicted. For ease of understanding, the method is described with reference to the components of FIGS. 1 and 2. The method begins at step 302, where exhaust gas and compressed air are received. In one example, the compressed air may be received from the compressor unit 102 and the exhaust gas may be received from the first turbine 106. In the example of FIG. 1, the first bypass channel 116 may be configured to receive the exhaust gas from the first turbine 106, while the second bypass channel 118 may be configured to receive the compressed air from the compressor unit 102.

Subsequently, at step 304, a value of a first portion of the exhaust gas may be determined. In one example, the value of the first portion of the exhaust gas may be determined based on one or more parameters associated with the exhaust gas at the inlet of the reheat combustor 108. In one example, the one or more parameters may include the oxygen concentration, the temperature, the species concentration, or combinations thereof, associated with the exhaust gas. Also, a value of a first portion of the compressed air to be bypassed may be determined based on the one or more parameters associated with the exhaust gas at the inlet of the reheat combustor 108.

Additionally, at step 306, the first portion of the exhaust gas from the first turbine 106 may be directed to the second turbine 110 so as to bypass the reheat combustor 108. Particularly, the first control valve 124 may be used to direct the first portion of the exhaust gas to the second turbine 110 via the first bypass channel 116. Also, the value of the first portion of the exhaust gas may be controlled or varied when the values of the one or more parameters associated with the exhaust gas at the inlet of the reheat combustor 108 exceed a determined or desired range of values.

In addition, at step 308, a second portion of the exhaust gas may be directed from the first turbine 106 to the reheat combustor 108. The first control valve 124 may be used to direct the second portion of the exhaust gas to the reheat combustor 108 via the third channel 120. Furthermore, at step 310, a first portion of the compressed air from the compressor unit 102 may be directed to the second turbine 110 so as to bypass the reheat combustor 108. Particularly, the second control valve 126 may be used to direct the first portion of the compressed air to the second turbine 110 via the second bypass channel 118. Also, the second control valve 126 may be configured to control a value of the first portion of the compressed air based on the one or more parameters associated with the exhaust gas at the inlet of the reheat combustor 108.

Subsequently, at step 312, a second portion of the compressed air may be directed from the compressor unit 102 to the reheat combustor 108. In one example, the second control valve 126 may be used to direct the second portion of the compressed air to the reheat combustor 108 via the fourth channel 122.

The various embodiments of the system and method aid in improving the performance of the gas turbine engine. In addition, the system and method enhance the efficiency of the gas turbine engine. Particularly, the system and method significantly improve the operating efficiency of the reheat combustor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gas turbine engine, comprising:
a primary combustor operatively coupled between a compressor unit and a first turbine;
a reheat combustor operatively coupled between the first turbine and a second turbine; and
a control unit comprising:
a first bypass channel operatively coupled between an outlet of the first turbine and an inlet of the second turbine and configured to bypass the reheat combustor;
a second bypass channel operatively coupled between a first outlet of the compressor unit and the inlet of the second turbine and configured to bypass the reheat combustor and the first turbine;
a first control valve operatively coupled to the first bypass channel and configured to direct at least a first portion of exhaust gas from the first turbine to the inlet of the second turbine via the first bypass channel; and
a second control valve operatively coupled to the second bypass channel and configured to direct at least a first portion of compressed air from the compressor unit to the inlet of the second turbine via the second bypass channel,
wherein the first portion of compressed air is combined with the first portion of exhaust gas at the inlet of the second turbine.

2. The gas turbine engine of claim 1, wherein the control unit is configured to determine a value of the first portion of the exhaust gas based on at least one parameter corresponding to the gas turbine engine.

3. The gas turbine engine of claim 2, wherein the control unit is configured to determine a value of the first portion of the compressed air based on the at least one parameter corresponding to the gas turbine engine.

4. The gas turbine engine of claim 2, wherein the at least one parameter comprises an oxygen concentration, a temperature, a species concentration, or combination thereof, corresponding to the exhaust gas at an inlet of the reheat combustor.

5. The gas turbine engine of claim 4, wherein the first control valve is configured to direct at least a second portion of the exhaust gas from the first turbine to the inlet of the reheat combustor.

6. The gas turbine engine of claim 5, wherein the control unit further comprises a third channel operatively coupled between the first control valve and the inlet of the reheat combustor and configured to channel the second portion of the exhaust gas to the inlet of the reheat combustor.

7. The gas turbine engine of claim 5, wherein the second control valve is configured to direct at least a second portion of the compressed air from the compressor unit to the inlet of the reheat combustor.

8. The gas turbine engine of claim 7, wherein the control unit further comprises a fourth channel operatively coupled between the second control valve and the inlet of the reheat combustor and configured to channel the second portion of the compressed air to the inlet of the reheat combustor.

9. The gas turbine engine of claim 7, wherein the reheat combustor is configured to generate a combustion gas using a first mixture comprising at least one of the second portion of the exhaust gas and the second portion of the compressed air.

10. The gas turbine engine of claim 9, wherein the second turbine is configured to form a second mixture by combining the combustion gas from the reheat combustor, the first portion of the exhaust gas, and the first portion of the compressed air.

11. The gas turbine engine of claim 10, wherein the second turbine is configured to convert a first energy associated with the second mixture into a second energy.

12. The gas turbine engine of claim 1, wherein the compressor unit is configured to compress air received at an inlet of the compressor unit and direct the compressed air to the second control valve via the first outlet of the compressor unit.

13. The gas turbine engine of claim 1, wherein the primary combustor is configured to:
receive high pressure compressed air from a second outlet of the compressor unit; and
generate a primary combustion gas using the high pressure compressed air.

14. The gas turbine engine of claim 13, wherein the first turbine is coupled to the primary combustor and configured to:
receive the primary combustion gas from the compressor unit; and
convert a first energy associated with the primary combustion gas into a second energy.

15. A method for enhancing efficiency of a gas turbine engine, comprising:
providing a primary combustor operatively coupled between a compressor unit and a first turbine:
providing a reheat combustor operatively coupled between the first turbine and a second turbine:
directing, by a first control valve, a first portion of exhaust gas from the first turbine to the second turbine;
directing, by the first control valve, a second portion of the exhaust gas from the first turbine to the reheat combustor;
directing, by a second control valve, a first portion of compressed air from the compressor unit to the second turbine by bypassing the first turbine and the reheat combustor; and
directing, by the second control valve, a second portion of the compressed air from the compressor unit to the reheat combustor.

16. The method of claim 15, further comprising determining a value of the first portion of the exhaust gas based on at least one parameter corresponding to the gas turbine engine.

17. The method of claim 16, further comprising determining a value of the first portion of the compressed air based on the at least one parameter corresponding to the gas turbine engine.

18. The method of claim 16, wherein the at least one parameter comprises an oxygen concentration, a temperature, a species concentration, or combination thereof, associated with the exhaust gas at an inlet of the reheat combustor.

19. The method of claim 18, further comprising controlling a value of the first portion of the exhaust gas to bypass the reheat combustor based on a value of the at least one parameter.

20. The method of claim 19, further comprising controlling a value of the first portion of the compressed air to bypass the reheat combustor based on the value of the at least one parameter.

21. The method of claim 15, further comprising:
receiving, by the first control valve, the exhaust gas from an outlet of the first turbine; and
receiving, by the second control valve, the compressed air from a first outlet of the compressor unit.

22. A gas turbine engine, comprising:
a compressor unit for compressing air;
a primary combustor operatively coupled to the compressor unit and configured to generate a primary combustion gas by compressing combusting the air received from the compressor unit;
a first turbine operatively coupled to the primary combustor and configured to produce exhaust gas;
a second turbine operatively coupled to the first turbine;
a control unit coupled to an outlet of the first turbine and an outlet of the compressor unit and configured to:
direct at least a first portion of the exhaust gas from the first turbine to an inlet of the second turbine;
direct at least a first portion of the compressed air from the compressor unit to the inlet of the second turbine by bypassing the first turbine;
a reheat combustor operatively coupled to the control unit and the second turbine and configured to:
receive at least a second portion of the exhaust gas from the first turbine and a second portion of the compressed air from the compressor unit; and
generate a combustion gas using the second portion of the exhaust gas and the second portion of the compressed air,
wherein the second turbine is configured to receive a mixture comprising at least the combustion gas from the reheat combustor, the first portion of the exhaust gas from the first turbine, and the first portion of the compressed air from the compressor unit.

* * * * *